INVENTOR.
ARNOST ANSCHERLIK
BY
ATTORNEY

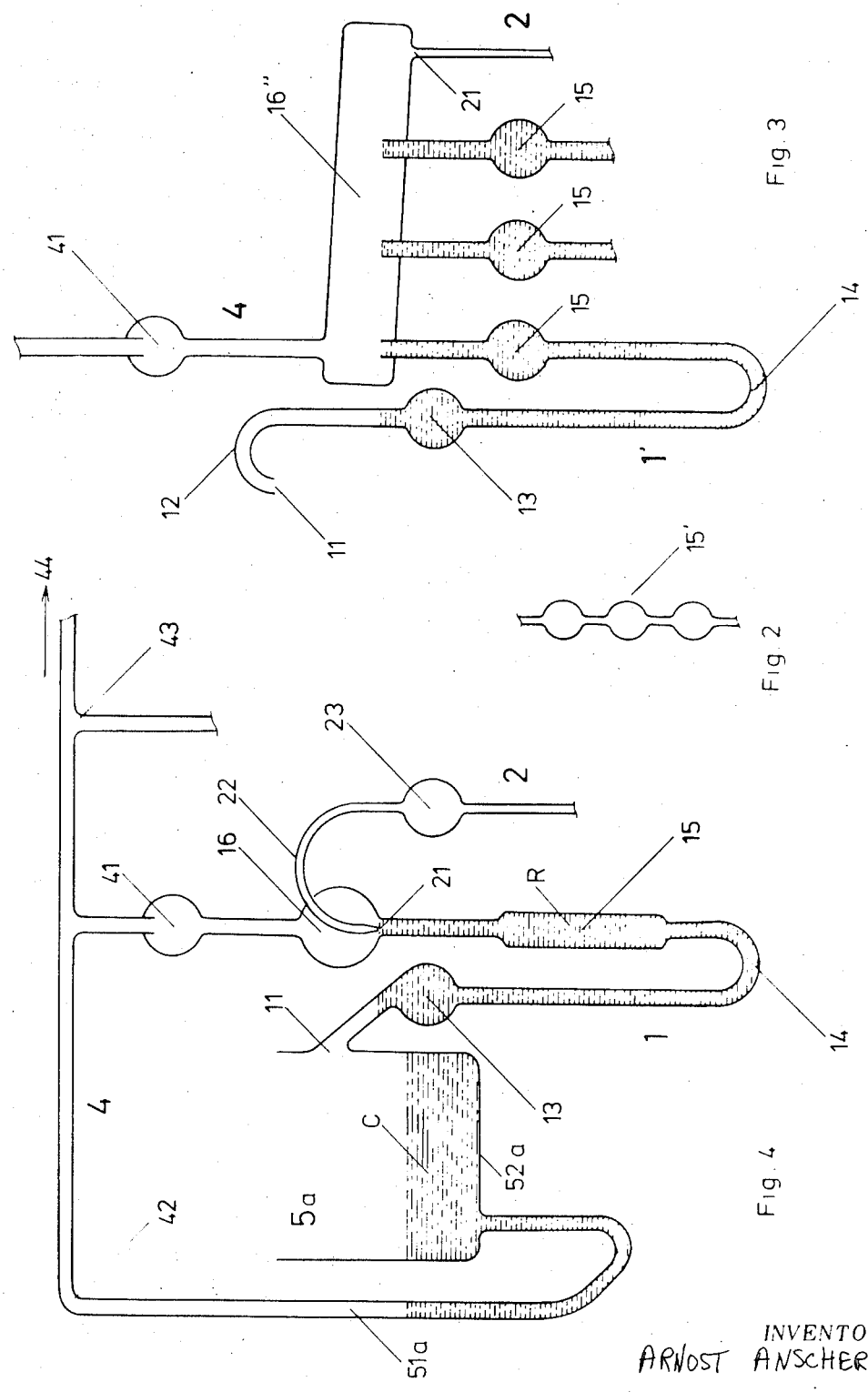

United States Patent Office 3,718,438
Patented Feb. 27, 1973

3,718,438
DOSING APPARATUS
Arnost Anscherlik, 1 Schwarzenbergstrasse,
8134 Adliswil, Switzerland
Filed Sept. 8, 1970, Ser. No. 70,402
Claims priority, application Switzerland, Sept. 26, 1969,
14,679/69
Int. Cl. B01l 3/00
U.S. Cl. 23—259
12 Claims

ABSTRACT OF THE DISCLOSURE

Dosing apparatus having an S-shaped dosing tube having an inlet and an outlet. An air supply means, such as a pump, is provided to supply air under pressure, vacuum or atmosphere to the inlet. A reagent storage tank having a supply tube leading into the inlet of the dosing tube is also provided. The mouth of the supply tube is connected near the inlet above the upper level of liquid in the reagent storage tank and at a level between the outlet of the dosing tube and the upper level of liquid in the reagent storage tank and has its other end connected to the bottom of the tank. The supply tube and dosing tube are formed to maintain a liquid seal against predetermined overpressure and vacuum produced in the device by the air pump and controlled by pressure and vacuum control units even if the reagent tank is at its lowest liquid level.

BACKGROUND OF INVENTION

The present invention relates to dosing apparatus and in particular to apparatus for dispensing measured quantities of liquid under intermittent operation.

Devices of this type are common in application in the chemical, water treatment and similar industries where determined amounts of liquid reagent must be dispensed into a recipient liquid, or system. Conventional dosing apparatus employs a siphon tube adapted to receive a quantity of liquid, from a storage source on which air pressure is periodically impressed. The pressure of the air forces within the tube cause the liquid to be expelled from it while the siphon created subsequently refills the tube from the storage source. These conventional devices are satisfactory for most applications, although they are inaccurate and inefficient for small dosing. In addition, their reliability is seriously jeopardized by the ability of air to become entrapped in the siphon tube or to mix with the dosing liquid. Furthermore, the accuracy of the dosing operation is dependent upon maintaining precise regulation of the level of liquid in the siphon tube and for this reason the conventional devices employ complex apparatus such as Mariotte bottles, floats valves, or the like to insure such precision.

It is the object of the present invention to provide an improved apparatus for dosing liquids which overcomes the drawbacks of the prior art.

It is an object of the present invention to provide an apparatus for dosing liquids which is more precise, reliable, and is capable of dispensing small quantities or doses of liquid.

It is another object of the present invention to provide a controlled dosing system wherein the dosing means is rendered free of air entrapment and other contaminating influences.

It is yet another object of the present invention to provide dosing apparatus automatically operable to deliver intermittent doses.

It is yet another object of the present invention to provide dosing apparatus in which the magnitude of the dose can be uniformly and constantly regulated.

These objects, others and numerous advantages of the present invention will be observed from the following disclosure of the preferred embodiments.

SUMMARY OF THE INVENTION

According to the present invention dosing apparatus is provided having an S-shaped siphon or dosing tube having a inlet and an outlet. An air supply means, such as a pump, and pressure and vacuum means are provided to supply air under pressure, vacuum, or atmosphere to the inlet. A reagent storage tank having a supply tube leading into the inlet of the tube is also provided. The mouth of the supply tube is connected at the inlet above the upper level of liquid in the reagent storage tank and at a level between the outlet of the tube and the upper level of liquid in the reagent storage tank and has its other end connected to the bottom of the tank. Each of the dosing and supply tube is formed to maintain a liquid seal against predetermined overpressure or vacuum in the device, produced by the air pump and controlled by overpressure and underpressure level control units even if the reagent tank is at its lowest liquid level.

Preferably, the pump is a double acting piston-cylinder arrangement adapted to be automatically activated to provide pressure in one stroke direction and vacuum in another, and to be movable to an atmosphere communicating condition. The air supply means also includes means for regulating the magnitude of the air pressure and vacuum supplied to the apparatus. The dosing liquid dispensed is proportional to the magnitude of the supplied air pressure. The pressure regulating means also is formed to provide for adjustment in the level of magnitude of pressure or vacuum.

The apparatus further contains a collecting vessel in which the reagent liquid from the storage tank is received and which premeasures the liquid fed to the dosing tube. In one embodiment, this collecting vessel is connected with a plurality of dosing tubes, each adapted to provide separate dose dispensings.

The dosing tube is also provided with a dosing vessel for measuring the dose. In a modification, this vessel comprises a series of bulbs adapted to provide a series of spaced doses rather than a single dose.

In another modification of the present apparatus, the pressure regulating means comprises a part of the recipient system so that the dose will be dispensed in proportion to the amount of liquid in the recipient system.

Full details of the present invention will be found in the following description.

BRIEF DESCRIPTION OF DRAWINGS

Reference is made to the accompanying drawings in which numerals refer to like parts. In the drawings:

FIG. 2 is an enlarged view of a modified dosing vessel,

FIG. 3 is a partial view of the apparatus of FIG. 1, showing a modification wherein multiple dosing tubes are used, and FIG. 4 is still another modification wherein is seen the combined application of the pressure regulating means and the recipient system.

Figure 1:
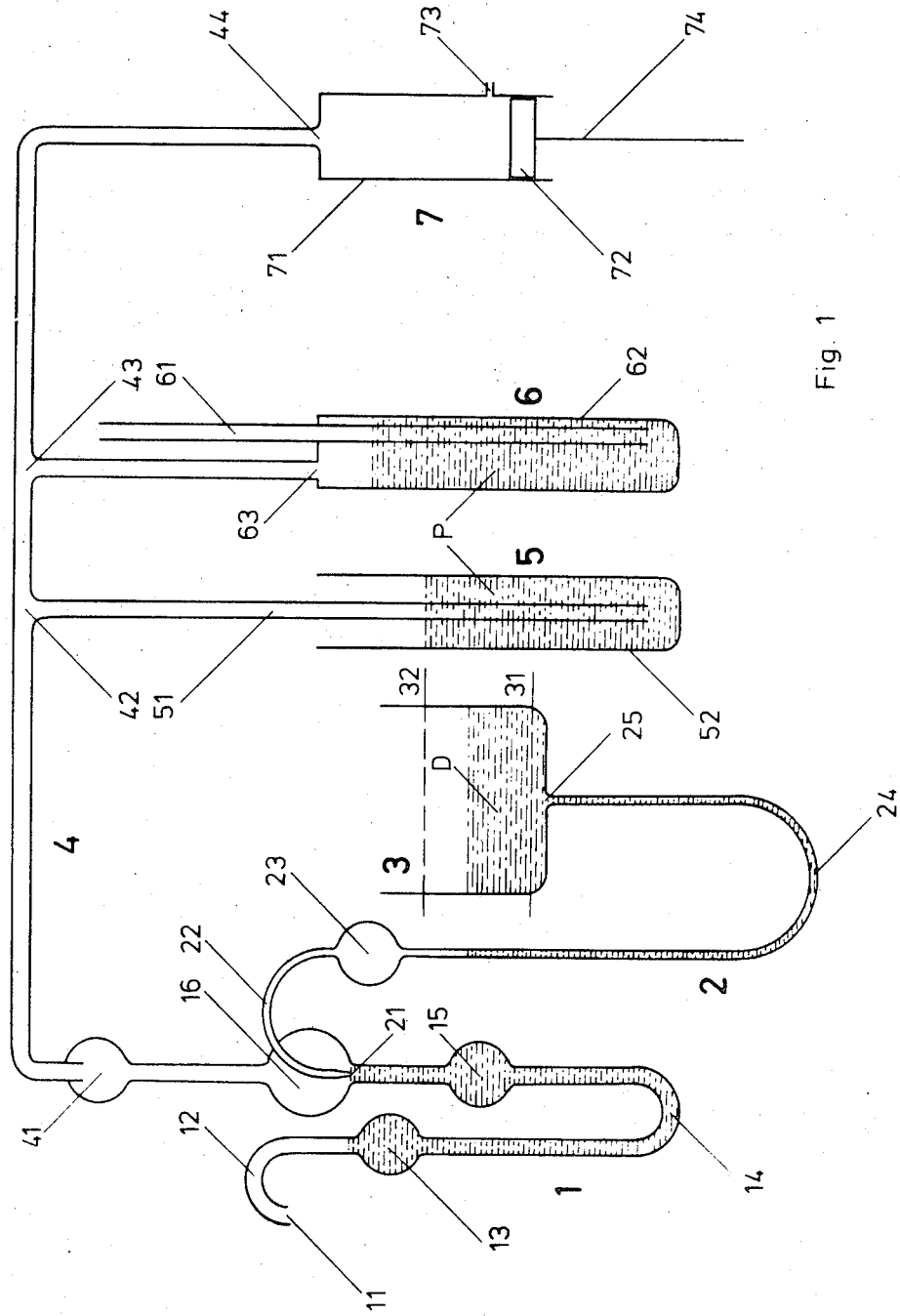
FIG. 1 is a schematic diagram of the dosing apparatus of the present invention.

In the figures only so much of the apparatus as is required for an understanding of this invention is shown. It will be obvious to those skilled in this art that the specific form of tubing, tanks, vessels, pipes, pumps, etc., is not critical and that any of the conventional pieces of apparatus can be used provided the same fit the structure and function required.

DESCRIPTION OF INVENTION

Turning to FIG. 1, the system of the present invention comprises an elongated vertical dosing tube 1 formed of an S-shaped tube having a discharge outlet orifice 11 at one end open to atmosphere or the receiving vessel of a recipient system, an upper bight 12, an intermediate spherical suction bulb 13, a lower bight 14, and a dosing vessel 15 at its other end, to which is connected the inlet portion of the tube 1. Connected to the inlet 17 of the tube 1 is a collecting vessel 16 also of spherical configuration, to which is connected a conduit 4 leading to a pressure level control 5, a vacuum level control 6 and an air pump 7 which is adapted to selectively produce an increase or decrease of pressure in the system or open the system to atmosphere.

Extending through the collecting vessel 16 and opening adjacent to the inlet of the tube 1 is a supply tube 2 also of S-shaped connecting to a supply tank 3 holding a predetermined quantity of dosing liquid D. The supply tube 2 has an inner, constricted suction mouth 21 at the level of the inlet 17 of the dosing tube bight 22, an intermediate retaining vessel 23, a lower bight 24 and a connector 25 communicating with the bottom of the tank 3. The retaining vessel 23 is merely a supplementary measure and is not required in most installations. The reagent tank 3 is provided with indicia defining a lower limit 31 and an upper limit 32 for the supply of reagent liquid.

The connecting conduit 4 leads upwardly from the collecting vessel 16 and is provided with aspherical vessel 41. From the vessel 41 the conduit extends horizontally and is provided with three vertically depending branches 42, 43, and 44 leading to the pressure control unit 5, the vacuum control unit 6, and the pump 7 respectively.

The pressure control unit 5 is shown as comprising a vessel 52 open to atmosphere and adapted to be filled with a predetermined level of a liquid P, not necessarily the same as that of either the reagent tank or the recipient system. A tube 51 extends from the branch 42 of conduit 4 into the liquid contained in vessel 52. The magnitude of the pressure in the system is regulated by the length of the tube 51 immersed in the liquid of vessel 52 and is proportionate to the actual level of submersion. Assuming that air under pressure is produced by the pump 7, air then flows through tube 51 until its pressure is sufficiently high to displace the liquid from the submerged tube 51 at which time air begins to bubble through the vessel 51 and into the atmosphere, venting and releasing excess pressure from the system. The vessel 52 is placed sufficiently below the horizontal conduit 4 so that, even in the event of an excess vacuum in the system, the liquid will not rise in tube 51 sufficiently to enter the conduit 4.

The vacuum control unit 6 comprises a closed vessel 62 which is also filled with a liquid. The closed vessel 62 is connected by means of a tube 63 to the conduit 4 via branch 43. Extending into the closed vessel 62 is a second tube 61 which is open at one end to atmosphere, while its lower end is submerged to a predetermined depth in the liquid. Like the pressure control unit, the magnitude of the vacuum permitted in the system is regulated by the depth of the tube 61, its depth being proportionate to the magnitude. Assuming that the pump 7 is operated to provide a vacuum in the conduit 4, then the pressure inside the vessel 62 is lower than atmospheric pressure and the atmosphere forces the liquid down the tube 61. When the vacuum level reaches the predetermined height air passes from tube 61 through the fluid in vessel 62 and bubbles up into the tube 63, thus increasing the pressure and regulating the vacuum. The tube 61 is preferably long enough to prevent flow of liquid upwardly through it, even in the event of an excess pressure in the system.

The control or regulating units 5 and 6 are only schematically shown. However, each are preferably provided with means for raising or lowering the tubes 51 or 61 relative to its associated vessel 52 or 62. The means may comprise movable tubes, standards, etc. or any well known and conventional means therefore.

The described units are preferred because of their simplicity, compatibility with liquid systems and because of their uniformity and stable operation. However, they may be replaced with suitable equivalent mechanisms, such as diaphragm valves, floating valves, check valves and other mechanisms suitable to regulate air or liquid flow.

The air pump 7 comprises a closed cylinder 71 to which the branch 44 from conduit 4 is connected. Opposed to the inlet from branch 44 is located a movable piston head 72. To the extreme outward end is a vent or opening 73 to atmosphere. Attached to the piston 72 is an actuating rod 74 which may be connected to motive means manually or automatically controlled to move the piston head 72. The motive means and its control apparatus is not shown in order to maintain this disclosure as brief as possible but it will be apparent to those skilled in this art that such mechanisms are conventional in nature and require no elaboration. Furthermore, equivalent pump structures will also be apparent to those skilled in this art.

On actuation of piston 72 upwardly toward branch 44 a pressure is created in the system. Downward movement creates a vacuum and movement past the atmospheric opening 73 vents the system to atmosphere.

The proper operation of the system is in large measure dependent upon the spatial and volumetric relationship between the various described elements. Some of these relationships have already been discussed, others must be found. Some important relationships follow:

The maximum amount of liquid which may be dosed or dispensed depends on the volume of the dosing vessel 15;

The volume of the collecting vessel 16 should be larger than that of the suction bulb 13 and of the dosing vessel 15;

The volume of the suction bulb 13 however should be larger than the volume of the dosing vessel 15;

The volume of the collecting vessel 16 has to be sufficient to contain at least enough liquid to subsequently fill the S-shaped tube 1 up to the level of the suction mouth 21 of the supply tube;

The upper part of the collecting vessel 16 should be located beneath the level of the upper bight 12 of the dosing tube 1;

The reagent storage tank 3 is filled with the liquid to be dosed at a level any where from the upper level limit 32 to the lower limit 31;

The curvature of the supply tube and the distance between the lower bight 24 and the lower liquid level limit 31 should be sufficient to insure that the liquid in the supply tube 2 maintains a liquid seal against the predetermined pressure or vacuum as it is produced in the system, by the air pump 7 and registered by the pressure level control unit 5 and the vacuum level control unit 6. This prevents the compressed air (gas) inside the dosing device from bubbling through the supply tube 2 from its lower bight 24 into the reagent tank 3;

The upper limit 32 of the liquid in tank 3 should be beneath the level of the suction mouth 21;

The suction bulb 13 should be located at a level below that of the inlet 17;

The level of the discharge orifice 11 should be above the level of the inlet 17;

The lower bight 14 of the dosing tube should be beneath the lower limit 31 of the reagent tank 3;

The distance between the level of the bottom of the suction bulb 13 of the dosing tube 1 and the level of the lower bight 14 should be sufficient so that the liquid in the tube 1 maintains liquid seal against the force of predetermined vacuum produced by the air pump 7 and controlled by vacuum level control unit 6;

The distance between the level of the bottom of dosing vessel 15 and the discharge orifice 11 has to be sufficient so that the liquid contained in supply tube 2 maintains a liquid seal against predetermined pressure produced by pump 7 and controlled by pressure control unit 5;

The distance between the bottom of the safety vessel 41 and the upper part of the collecting vessel 16 should be sufficient to prevent liquid from entering the safety vessel on production of an excess vacuum even if the liquid in tank 3 is at or above the upper limit 32.

The aforedescribed system operates as follows:

The dosing tube 1 is initially filled with reagent liquid up to the level of mouth 21 to form an initial liquid seal in the apparatus. The reagent tank 3 is filled, filling also the supply tube 2, to the level between the upper limit 32 and the lower limit 31. The pressure and vacuum control units are, of course, regulated to provide a predetermined constant pressure and vacuum level.

On movement of the piston 72 upwardly a pressure is formed in conduit 4 which acts through the collecting vessel 16 to be impressed on liquid contained in the dosing tube 1, forcing a portion of the liquid in the tube (proportional to the pressure as controlled by unit 5) out of the discharge orifice 11 emptying a comparable portion of the bulb 15. Simultaneously, a part of the liquid in tube 2 is forced backward into the reagent tank 3. The magnitude of the pressure is predetermined and held constant by the pressure control unit 5, so that if the pump 7 compresses the air (gas) the desired amount of the liquid contained in the dosing vessel 15 is pressed out (proportionally to the pressure) of the dosing tube 7, through the discharge orifice 11.

On making a return stroke of the piston 72 (i.e. downwardly), a vacuum is created in the system, which because of the vacuum control unit 6, is held at a predetermined constant level. The vacuum draws on the remaining liquid in tube 1 and sucks liquid from suction bulb 13 back into the now at least partial emptied vessel 15 and also into the collecting vessel 16 partially filling it. Because the vessel 15 and the vessel 13 are directly connected and the air is sucked through the vessel 15 from the top, the vessel 13 is emptied rapidly. The vacuum acts at the same time on the liquid in the supply tube 2, therefore, the liquid flows straight up through the retaining sphere 23 into the collecting vessel 16 and fills the collecting vessel 16 full. Because the retaining sphere 23 has a predetermined volume the liquid which is sucked has to fill, at first, said retaining vessel 23 and after it has filled said vessel, may flow into collecting vessel 16. Therefore, the filling of collecting vessel 16 from reagent tank 3 through supply tube 2 is delayed. Said delaying is set so that the collecting vessel 16 is at first filled with liquid from dosing tube 1 and afterward from the supply tube 2. This arrangement enables dosing vessel 15 to be fully filled with liquid from the suction bulb 13 and all air from said vessel 15 is sucked out so that the air bubbles do not arise in the dosing tube. The magnitude of the vacuum is predetermined to a level where the filling vessel 16 is completely filled.

When the piston 72 is caused to move downwardly even further and to pass the opening 73, the system is instantly opened to atmosphere. As this occurs, the liquid contained in the collecting vessel 16 drops downwardly, filling the entire siphon tube, including the suction bulb 13. The liquid fills the tube 1 to a level just above the inlet 17 since the bight 12 is on a substantially higher level because any excess portion of the liquid will thereafter flow back through the supply tube 2 into the reagent tank 3 until the level of the liquid in tube 1 is on a par with the mouth 21. The level of the liquid in the tube will now remain at a constant level, even if the volume of liquid in the reagent tank varies and swings between its upper and lower limit.

On again moving the piston in the upward direction a new dosing cycle is instituted.

It will thus be seen that the present invention provides a system and apparatus by which even small minute doses of reagent liquid can be fed. This is possible because of the ability to control at a fixed constant level the magnitude of the air pressure and vacuum. This control remains uniform through any number of cycles. Furthermore, the liquid dosed is free of entrapped air or of air bubbles or other impurities which can be created in conventional devices. Since the movement between the vessels 15 and 13 occurs via their lower ends respectively, all air escapes vertically from the other or upper ends. The location of the dosed fluid in the final bight 14 of the dosing fixture 1 permits the liquid to settle and release entrapped air. Also movement of the liquid in the reagent tank 3, as during filling or emptying has no effect on the actual dosing.

In FIG. 2 there is shown a modified version of the dosing vessel 15 (seen in FIG. 1) which enables the delivery of reagent liquid in serial increments. Here the dosing vessel comprises several spherical globes 15' arranged one above the other, each adapted to receive a quantity of liquid from the supply tube in manner aforementioned. As pressure is exerted, the liquid moves from one globe 15' to the next incrementally feeding a defined quantity through the dosing fixture and out of the supply tube.

In FIG. 3 another construction is shown in which several quantities of reagent liquid are dosed simultaneously and in parallel. In this modification the collecting vessel comprises a rectangular box-like tank 16" to which a number of dosing tubes 1 are attached. Each dosing tube is similar to that shown in FIG. 1 comprising the discharge orifice 11, the upper bight 12, the suction bulb 13, the lower bight 14 and the dosing vessel 15. Each dosing tube is arranged laterally with respect to each other and connects with the bottom of the collecting vessel 16". The collecting vessel itself is slanted downwardly toward the reagent tank 3 and the inlet supply tube 2. However, as in the system of FIG. 1, the spatial and volumetric relationship between the element is maintained and the device operates in the same manner, except that the level of dosing liquid is determined by the upper edge of the dosing tube 1 inlet 17, in the collecting vessel and not by mouth 21, and on filling of the collecting vessel 16" a plurality of dosing tubes 1 is fed, and the plural dosing vessels 15 all filled. Subsequent pressurization of the system causes each of the multiple dosing tube to deliver dosing units of reagent liquid. The discharge units may, of course, lead to separate recipient apparata.

Still another modification is shown in FIG. 4 which, by forming the pressure control unit as part of the recipient system, provides for the dosing of liquid in proportion to the amount of liquid in the recipient system. As seen in FIG. 4, the vessel 52a comprising part of pressure control system 5a is filled with the liquid C of the recipient system (and not with an auxiliary or secondary fluid), and is connected by the tube 51a at its bottom wall to the connecting conduit 4. The conduit 51 extends in a U-shaped manner below the bottom of the vessel 52a so that a quantity of liquid fills the tube 51a to the level of the liquid C in tank 52a. The orifice 11 in this modification the dosing tube 1 has no upper bight of the dosing tubes 1 enters into the tank 52a above the level of the liquid C so that the reagent liquid R may be fed directly to it. Consequently, here the recipient liquid C acts as the medium for the pressure control unit 5a, the level height of which determines the magnitude of the pressure, and consequently the dosing is proportional to the amount of liquid in the tank 52a.

Numerous other modifications and changes will be apparent to those skilled in this art. It is intended therefore that the present disclosure be taken as illustrative only of the invention and not limiting of it in any manner.

What is claimed:

1. Apparatus for dosing a reagent to a recipient system, comprising (a) a tube having an inlet orifice, outlet orifice and a lower bight, (b) a bulb forming part of said tube located between the outlet orifice and the lower bight, (c) a dosing vessel forming part of said tube located at the other side of the lower bight from said bulb at a level beneath the bottom of said bulb, (d) a collecting vessel located above the inlet orifice at a level below that of the outlet orifice and above that of said bulb, (e) a tank for storing reagent liquid having upper and lower storage levels, (f) a supply tube communicating the interior of said reagent storage tank with the inlet of said tube, the mouth of said supply tube located above the upper liquid level of said reagent tank and between the level of the outlet orifice of said tube and the upper liquid level of said reagent tank, and (g) means for selectively providing air under pressure, vacuum or atmosphere to said collecting vessel.

2. Apparatus according to claim 1, wherein said tube is S-shape and has an upper bight between the outlet orifice and the bulb and wherein said supply tube is S-shaped and formed with upper and lower bights and has its mouth located below level of the upper bight of said tube, said collecting vessel is located below level of upper bight of said tube, and said outlet orifice of said tube is located between the bight of said tube and the level of the inlet orifice of said dosing tube.

3. The apparatus according to claim 1 wherein said means for selectively providing air includes
a pressure control unit,
a vacuum control unit,
pneumatic supply means, and
conduit means connecting said tube through said collecting vessel, said pressure control unit, said vacuum control unit and said pneumatic means.

4. The apparatus according to claim 1 wherein said dosing vessel comprises a plurality of globes arranged in series with each other.

5. The apparatus according to claim 1 wherein the collecting vessel is mounted about said inlet orifice of said dosing tube to form a receptacle for receiving liquid from said supply tube, said inlet extending into said collecting vessel to provide a defined level therein.

6. The apparatus according to claim 5 wherein the mouth of said supply tube is constricted and is located within said collecting vessel to form a suction orifice.

7. The apparatus according to claim 5 wherein said apparatus contains a plurality of said tubes, the inlet of each is connected separately to said collecting vessel whereby each tube may be adapted to receive and dispense dosing liquid.

8. The apparatus according to claim 3 wherein said means for supplying air comprises a double acting pump operable to provide air under pressure, air under vacuum, or atmospheric air, and includes means for regulating the magnitude of the pressure and vacuum produced.

9. The apparatus according to claim 8 wherein said pressure and vacuum regulating means communicate in parallel with said pump to said connecting conduit.

10. The apparatus according to claim 8 wherein said pressure regulating means comprises a vessel open to atmosphere, liquid contained in said vessel, and a tube communicating with the connecting conduit, said tube being mounted for insertion in said liquid of said regulating vessel to a selective level relative to said liquid, said level being proportional to the magnitude of said pressure.

11. The apparatus according to claim 8 wherein said regulation means comprises a receiving vessel of a recipient system, and said regulating liquid is at least a portion of said recipient system, and said discharge orifice empties into said portion, whereby said dosing liquid is proportional to the recipient liquid.

12. The apparatus according to claim 8 wherein said vacuum regulating means comprises a closed vessel, a liquid contained in said vessel, a tube communicating between the connecting conduit and said vessel, and a second tube extending into said closed vessel and communicating with atmosphere, said second tube being mounted for insertion in said closed vessel to a selective level relative to said liquid therein, said level being proportional to the magnitude of said vacuum.

References Cited
UNITED STATES PATENTS

| | | | |
|---|---|---|---|
| 3,182,865 | 5/1965 | Anscherlik | 222—416 |
| 2,577,014 | 12/1951 | Johnson | 222—204 UX |
| 3,338,564 | 8/1967 | Roeder | 222—416 X |

ROBERT B. REEVES, Primary Examiner

J. P. SHANNON, Assistant Examiner